United States Patent [19]

Fischbeck et al.

[11] 4,322,063

[45] Mar. 30, 1982

[54] SUSPENSION FOR AN OSCILLATING BAR

[75] Inventors: Kenneth H. Fischbeck, Dallas; Allen T. Wright, Lewisville, both of Tex.

[73] Assignee: Xerox Corporation, Stamford, Conn.

[21] Appl. No.: 140,363

[22] Filed: Apr. 14, 1980

[51] Int. Cl.³ .................................................. F16F 1/26
[52] U.S. Cl. ..................................... 267/160; 188/380
[58] Field of Search ........................ 188/1 B, 379, 380; 267/41, 158, 160, 165

[56] References Cited

U.S. PATENT DOCUMENTS

| | | | |
|---|---|---|---|
| 1,140,101 | 5/1915 | Bauer | 188/1 B X |
| 2,989,298 | 6/1961 | Ljungström | 267/160 |
| 3,077,244 | 2/1963 | Evjen | 188/1 B |
| 3,238,780 | 3/1966 | Doyle | 267/160 X |

Primary Examiner—Duane A. Reger
Attorney, Agent, or Firm—Richard A. Tomlin

[57] ABSTRACT

An improved suspension for an axially oscillating bar. The suspension is a trifurcated spring, the bar being attached to the central section of the spring. The spring may be mounted to act as a multiple cantilever spring. Preferably, two matching springs are used to suspend the bar.

2 Claims, 7 Drawing Figures

SUSPENSION FOR AN OSCILLATING BAR

The invention relates to an improved suspension for an oscillating bar. The use of oscillating bars in mechanical devices is well known. Such bars have found increased acceptance in marking systems for supporting an array of reading and/or marking devices. A key to the successful operation of such an oscillating bar is the suspension system. The preferred suspension system, particularly where the oscillating bar is to be used in an office environment, would be relatively quiet in operation and have a low power requirement, which low power requirement in turn minimizes heat dissipation requirements. In marking systems, the suspension must be designed to hold the oscillating array in spaced relationship to the material being scanned either reading or marking within relatively close tolerances. Also, the oscillating bar must be held firmly against side to side movement. This, of course, is crucial to prevent spurious input and/or output signals. The invention as claimed is intended to provide an improved oscillating bar suspension, which, in addition, is inexpensive and relatively simple to manufacture.

The invention is described in detail below with reference to the drawing in which.

Figure 1:
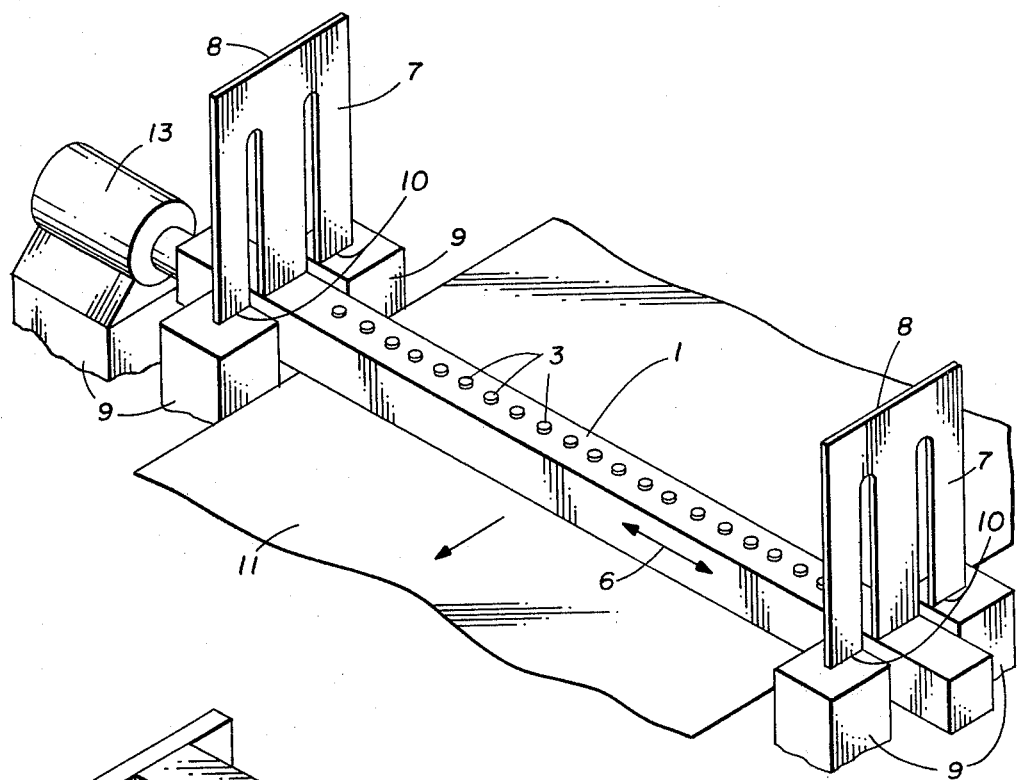
FIG. 1 shows a bar suspended for axial oscillation using the trifurcated flexure suspension means of this invention in the multiple cantilever spring mode.

Referring now to FIG. 1, there is seen an array bar 1 having marking and/or reading elements represented by circles 3 supported thereon. For example, these units may be photodetectors used for reading or ink jet nozzles used for marking a sheet (not shown) placed over the bar 1 in spaced relationship thereto. Both input reading means and output marking means could be supported by array bar 1 as disclosed in commonly assigned, concurrently filed patent application entitled "Multifunction Graphic Engine Based on an Oscillating Scanner" filed Apr. 14, 1980, Ser. No. 140,364, the disclosure of which is hereby incorporated by reference. Array bar 1 is suspended for axial oscillatory movement in the direction shown by arrows 6 by trifurcated flexure mounts 7, which act as multiple compounded cantilever springs. The flexure mount 7 being relatively wide minimizes sideways movement of array bar 1. Since the whole flexure mount 7 is flexible, not only does array bar 1 pivot about edge 8, but edge 8 pivots about fixed edge 10, which is the line of contact between flexure mount 7 and fixed frame 9. This double-pivoting multicantilever action keeps support member 1 in spaced relationship to the document to be read or sheet to be marked, for example, sheet 11 during its complete travel, better than would result from a single pivot action. The marking and/or reading elements, which would be on the bottom of the bar, are not shown. The array bar 1 is oscillated by oscillating means 13, which may be, for example, a solenoid. Oscillating means 13 is also fixed to frame 9. Very little power is required to start the array bar 1 moving and even less is required to keep it moving since the flexure mount can be vibrated at its natural harmonic oscillation frequency. This hanging type of flexure eliminates the rolling, sliding or rubbing friction resulting from the use of conventional oscillating means. The apparatus is also relatively quiet in operation.

Figure 2:
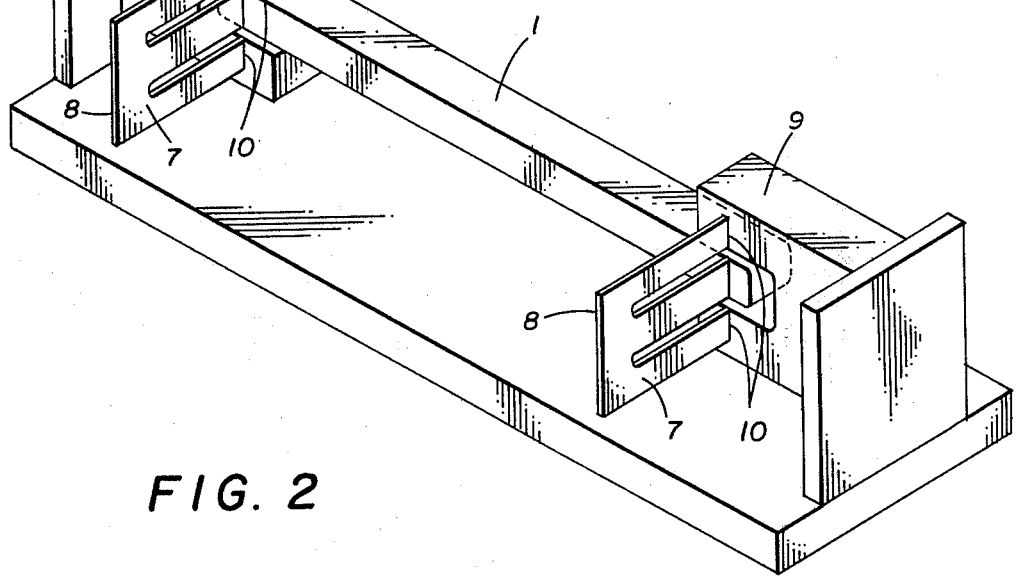
FIG. 2 shows a bar mounted for oscillation wherein the trifurcated suspension means of this invention is utilized in the "horizontal" aspect and in the multiple cantilever spring mode.

Referring now to FIG. 2, there is seen an array bar 1 again suspended for axial oscillation by trifurcated flexure mounts 7. Here, however, the flexure mounts are positioned in a horizontal aspect. This structure demonstrates the resistance to non-axial movement, which can be provided by the trifurcated flexure mount of this invention. As in the FIG. 1 structure, array bar 1 does not contact any member other than trifurcated flexure mount 7. Again, the pivoting or swing of array bar 1 about edge 8 is minimized by the pivoting of edge 8 around line of contact 10 between trifurcated flexure mount 7 and frame 9. The use of the trifurcated flexure mounts in the horizontal position may be useful for providing a lower profile apparatus. The oscillatory means is not shown in FIG. 2 but could be similar to that shown in FIG. 1.

Figure 3:
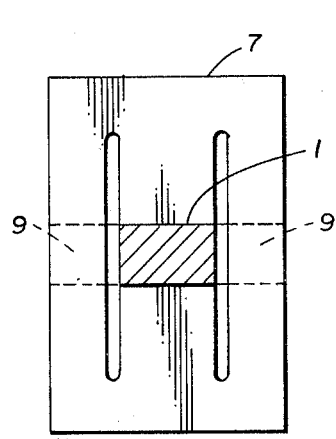
FIG. 3 is a planar view of another embodiment of the suspension means of this invention.

Referring now to FIG. 3, there is seen another embodiment of the trifurcated flexure mount of this invention. Here, flexure mount 7 is fixed to frame 9 as shown in FIGS. 3 through 6. Array bar 1 is again fixed to the central segment of the trifurcated flexure mount 7.

Figure 4A:
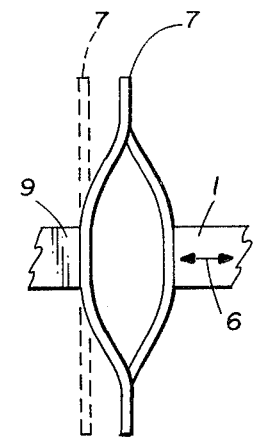
FIGS. 4A and 4B are side views of the trifurcated suspension means of this invention, which shows, greatly exaggerated, the spring shape at either extreme of its flexure.
Figure 4B:
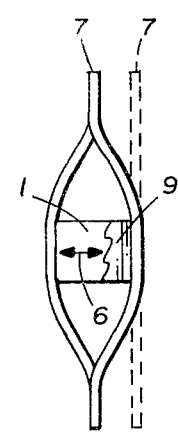

Referring now to FIGS. 4A and 4B, there is seen fixed frame 9 to which trifurcated flexure mount 7 is attached. At rest flexure mount 7 is in the position shown by the dashed lines. When array bar 1 is in the far right position (as shown in FIGS. 4A and 4B), flexure mount 7 and array bar 1 are in the position as shown in FIG. 4A. FIG. 4B represents array bar 1 being in the far left position. It can be seen that the array bar in this instance does not swing but moves axially in the direction shown by arrows 6 only. This can better be understood by reference to FIGS. 5 and 6.

Figure 5:
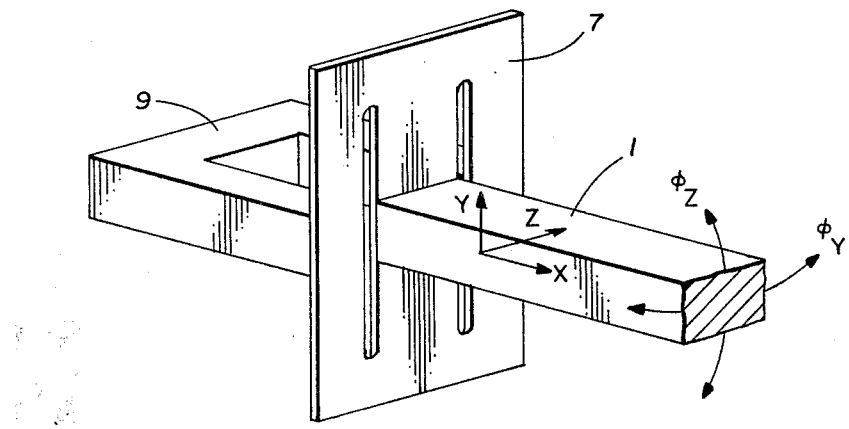
FIGS. 5 and 6 show how the use of the trifurcated suspension means of this invention restricts the movement of the oscillating bar to the desired one degree of freedom, i.e., axial.
Figure 6:
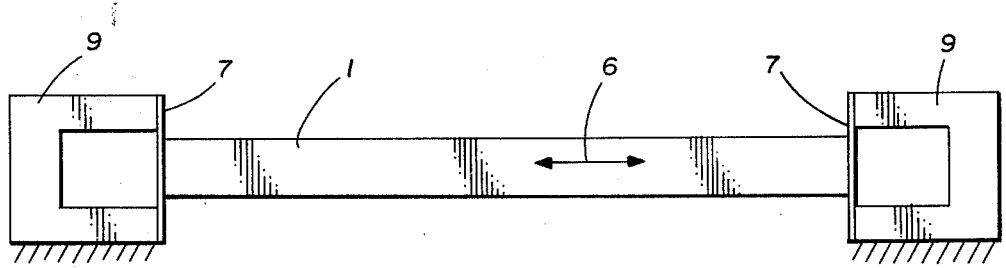

Referring now to FIG. 5, frame 9 fixed to a base (not shown) supports flexure mount 7 and array bar 1. It can be seen that array bar 1 cannot be moved in the directions indicated by arrows Y and Z because the structure of trifurcated flexure mount 7 resists such movement. Directions Y, Z and $\theta_x$ are accordingly stable. The end of the array bar, however, can be tilted in the directions shown by curved arrows $\theta_y$ and $\theta_z$. To stabilize the $\theta_y$ and $\theta_z$ movement of array bar 1, it is preferred to utilize a second trifurcated flexure mount parallel to the first as shown in FIG. 6. FIG. 6 represents a simplified schematic top view of the mounting shown in FIGS. 3-5. The use of the second flexure mount eliminates $\theta_z$ and $\theta_y$ movement of bar 1 effectively limiting the motion of bar 1 to the X or axial direction desired.

Although specific components have been disclosed herein, many modifications and variations will occur to those skilled in the art. Such modifications and variations are intended to be included with the scope of the appended claims.

What is claimed is:

1. An apparatus for axially oscillating a bar, which comprises:

a trifurcated flexure means having a central section and two outer sections;

a frame connected to said outer sections such that said central section will act as a multiple compound cantilever when oscillated;

a bar connected to only said central section of said trifurcated flexure means for oscillatory movement therewith; and means for causing oscillation of said bar and said central section.

2. The apparatus of claim 1 wherein said bar is connected to the central section of more than one trifurcated flexure means and said frame is connected to the outer sections of each of said trifurcated flexure means such that said central section of each of said trifurcated flexure means will act as a multiple compound cantilever when oscillated.

* * * * *